United States Patent Office 3,213,101
Patented Oct. 19, 1965

3,213,101
1-(2-ALKENYLOXY)-2(1H)-PYRIDONES
Leo A. Paquette, Portage Township, Kalamazoo County, Mich., assignor to The Upjohn Company, Kalamazoo, Mich., a corporation of Delaware
No Drawing. Filed Sept. 16, 1963, Ser. No. 309,295
3 Claims. (Cl. 260—297)

This invention relates to novel compositions of matter and to methods for producing them. In particular, this invention relates to novel 1-(2-alkenyloxy)-2(1H)-pyridones of the formula:

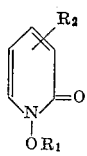

wherein $R_1$ is 2-alkenyl of 3 to 8 carbon atoms, inclusive, and wherein $R_2$ is selected from the group consisting of hydrogen and methyl. When $R_2$ is methyl, it can be located at the 3-, 4-, 5-, or 6-position of the pyridone ring.

Examples of 2-alkenyl of 3 to 8 carbon atoms, inclusive are allyl, 1-methylallyl, 2-methylallyl (methallyl), 2-butenyl (crotyl), 1,2-dimethylallyl, 2-ethylallyl, 1-methyl-2-butenyl, 2-methyl-2-butenyl, 3-methyl-2-butenyl, 2-pentenyl, 2,3-dimethyl-2-butenyl, 1,3-dimethyl-2-butenyl, 1-ethyl-2-butenyl, 4-methyl-2-pentenyl, 2-hexenyl, 4,4-dimethyl-2-pentenyl, 2-heptenyl, 2-octenyl, 1,4-dimethyl-2-hexenyl, and the like.

The novel 1-(2-alkenyloxy)-2(1H)-pyridones of Formula I are useful for the treatment of topical fungal infections in mammals, e.g., humans, cattle, horses, dogs, and cats, and in other animals, caused by fungi such as *Trichophyton rubrum,* or for eradicating such fungi from inanimate objects. Tests with animals have also shown these compounds to have sedative and muscle relaxant effects, and the compounds are therefore useful for those purposes. These compounds have also been shown to inhibit the growth of *Pseudomonas fluorescens,* a bacterium known to be involved in the spoilage of shell eggs and in the deterioration of wool in paper mill operations.

The novel compounds of Formula I are basic and exist either in the non-protonated (free base) form or in the protonated (acid addition salt) form depending on the pH of the environment. They form stable protonates, i.e., acid addition salts, on neutralization with suitable strong acids, for example, hydrochloric, hydrobromic, sulfuric, phosphoric, nitric, methanesulfonic, picric, trichloroacetic acids, and the like. These acid addition salts are useful for upgrading the free bases.

The novel Formula I compounds form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The novel 1-(2-alkenyloxy)-2(1H)-pyridones of Formula I are produced by reacting a pyridine 1-oxide of the formula:

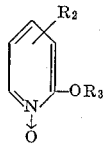

wherein $R_2$ is as defined above and wherein $R_3$ is alkyl of 1 to 3 carbon atoms, inclusive, with a 2-alkenyl halide of the formula, $R_1X$, wherein $R_1$ is as defined above and X is selected from the group consisting of chloride, bromide, and iodide. Examples of alkyl of 1 to 3 carbon atoms, inclusive, are methyl, ethyl, and propyl.

Pyridine 1-oxides of Formula II are either known in the art or can be prepared by methods known in the art [e.g., J. Am. Chem. Soc. 81, 2537–41 (1959); J. Chem. Soc. 1864–6 (1948); J. Chem. Soc. 2091–4 (1949); J. Chem. Soc. 4375–85 (1957)].

2-alkenyl halides of the formula $R_1X$ are either known in the art or can be prepared by methods known in the art. See, for example, Chem. Rev. 56, 753–901 (1956). Examples of suitable halides are the chlorides, bromide, and iodides of the specific 2-alkenyl moieties given above.

The reaction between a Formula II pyridine 1-oxide and a 2-alkenyl halide is carried out by mixing these two reactants and heating in the range about 25° to about 125° C., preferably in the range about 40° to about 75° C., for about 1 to about 10 hours. At least one mole of 2-alkenyl halide should be mixed with each mole of pyridine 1-oxide, and it is preferred to use an excess, for example, about 2 to 4 or even more moles, of those halides with relatively low boiling points and likely to be lost by evaporation during the reaction. Although it is preferred to carry out the reaction in the absence of a diluent, especially when the reaction mixture is a homogeneous liquid at the reaction temperature, an inert liquid diluent, for example, a hydrocarbon or an ether of the appropriate boiling point can be used. Examples of suitable diluents are benzene, toluene, xylene, cyclohexane, diethyl ether, dibutyl ether, and the like. The desired 1-(2-alkenyloxy)-2(1H)-pyridone can be isolated from the reaction mixture and purified by conventional techniques, for example, by fractional distillation, recrystallization, or chromatography.

The invention can be more fully understood by the following examples.

*Example 1.—1-allyloxy-2(1H)-pyridone*

A mixture of 2-ethoxypyridine 1-oxide (7.0 g.; 0.05 mole) and allyl bromide (12.1 g.; 0.10 mole) was refluxed 3.5 hours. The reaction mixture was then distilled at reduced pressure to give 7.3 g. of 1-allyloxy-2 (1H)-pyridone in the form of a colorless liquid; B.P. 89–92° C. at 0.1 mm. A center cut (B.P. 91° C. at 0.1 mm.; $n_D^{30}$ 1.5442) was analyzed.

*Analysis.*—Calcd. for $C_8H_9NO_2$: C, 63.56; H, 6.00; N, 9.27. Found: C, 63.85; H, 6.46; N, 8.71.

U.B. ($C_2H_5OH$) 229 m$\mu$ ($\epsilon$=6,000); 301 m$\mu$ ($\epsilon$=5,400).

I.R. (principal band; undiluted) 1660 cm.$^{-1}$.

Following the procedure of Example 1 but using in place of allyl bromide, methallyl chloride; crotyl chloride; 2-ethylallyl bromide; 2-pentenyl bromide; 2,3-dimethyl-2-butenyl chloride; and 2-heptenyl iodide, the corresponding 2(1H)-pyridones are obtained.

Following the procedure of Example 1 but using in place of the combination allyl bromide and 2-ethoxypyridine 1-oxide, allyl iodide and 2-methoxypyridine 1-oxide; 1-methylallyl chloride and 3-methyl-2-ethoxypyridine 1-oxide; 1,2-dimethylallyl bromide and 4-methyl-2-methoxypyridine 1-oxide; 1,3-dimethyl-2-butenyl bromide and 5-methyl-2-ethoxy-pyridine 1-oxide; 2-hexenyl chloride and 6-methyl-2-methoxypyridine 1-oxide; and 2-octenyl chloride and 2-propoxypyridine 1-oxide, the corresponding 2(1H)-pyridones are obtained.

I claim:
1. A compound of the formula:

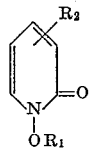

wherein $R_1$ is 2-alkenyl of 3 to 8 carbon atoms, inclusive, and wherein $R_2$ is selected from the group consisting of hydrogen and methyl.

2. 1-allyloxy-2-(1H)-pyridone.

3. A process for producing a 1-(2-alkenyloxy)-2(1H)-pyridone of the formula:

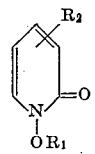

wherein $R_1$ is 2-alkenyl of 3 to 8 carbon atoms, inclusive, and wherein $R_2$ is selected from the group consisting of hydrogen and methyl, which comprises mixing a pyridine 1-oxide of the formula:

wherein $R_2$ is as defined above and wherein $R_3$ is alkyl of 1 to 3 carbon atoms, inclusive, with a 2-alkenyl halide of the formula, $R_1X$, wherein $R_1$ is as defined above and X is selected from the group consisting of chloride, bromide, and iodide, to form said 1-(2-alkenyloxy)-2(1H)-pyridone.

No references cited.

WALTER A. MODANCE, *Primary Examiner.*